C. W. LINK & M. MAHONY.
Horse-Troughs.

No. 150,423. Patented May 5, 1874.

Witnesses.
Harry Coleman
Edmund Masson

Inventors.
Calvin W. Link & Michael Mahony,
By their Attorney A. B. Stoughton.

AM. PHOTO-LITHOGRAPHIC CO. N.Y. (OSBORNE'S PROCESS)

UNITED STATES PATENT OFFICE.

CALVIN W. LINK AND MICHAEL MAHONY, OF TROY, NEW YORK.

IMPROVEMENT IN HORSE-TROUGHS.

Specification forming part of Letters Patent No. 150,423, dated May 5, 1874; application filed July 11, 1873.

*To all whom it may concern:*

Be it known that we, CALVIN W. LINK and MICHAEL MAHONY, of the city of Troy, county of Rensselaer and State of New York, have invented certain new and useful Improvements in Feed Boxes or Troughs; and that the following is a full, clear, and exact description of the same, reference being had to the accompanying drawings making a part of this specification, in which—

Figure 1:
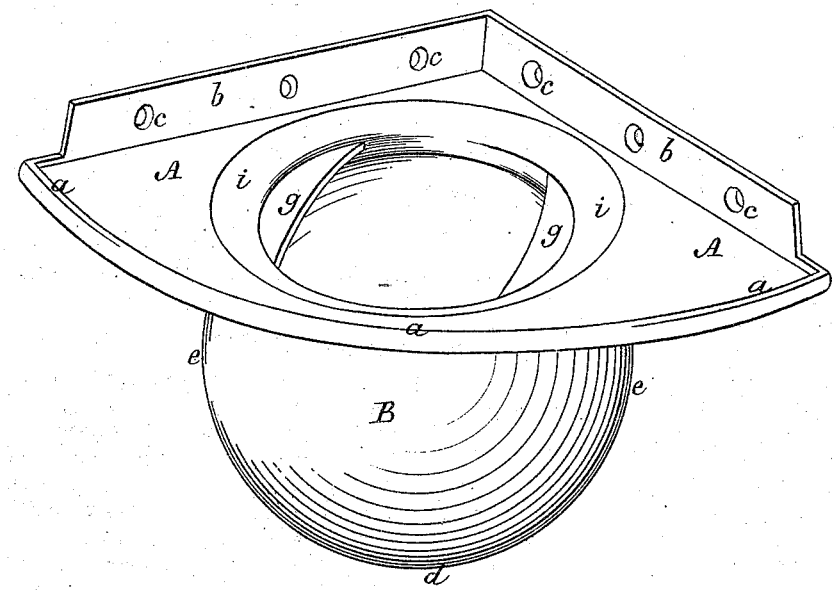
Figure 2:
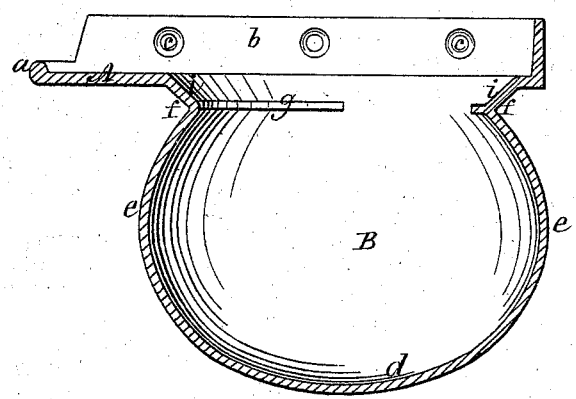

Figure 1 represents one of our feed-boxes in perspective. Fig. 2 represents a section through the same.

In cast-iron feed-boxes as heretofore constructed no suitable provision was made to prevent the animals feeding therefrom from rooting out and wasting the feed. The object and purpose of our invention are to make a convenient and sightly feed-box that will prevent the animals from throwing out and wasting their feed; and our invention consists in a feed-box having a rounded bottom, flaring or bulging sides, and a contracted flanged top, so that animals feeding therefrom cannot root or throw out and waste their food.

To enable others skilled in the art to make and use our invention, we will proceed to describe the same with reference to the drawings.

The feed box or trough shown in the drawings may be cast in one single piece, in which way we prefer to make it. A represents a table with a bead, *a*, around its front, and with vertical flanges *b b* at its other sides, by which it may be secured in convenient position by screws or nails passing through the holes *c* therein. Suspended from the table A is the box or trough B, which is by preference of a hollow globular form, as shown. The bottom *d* of the feed-box is rounded, its sides *e* are flared or bulged out, and the top *f* contracted. Besides the contraction of the top portion of the box or trough itself there are horizontal flanges *g g* projecting over the opening of the said box or trough, that makes said opening of an oval rather than a circular form, so that a horse or other animal may easily insert its head, or a portion thereof, while the flanges *g* will prevent the food from being thrown out and wasted. Around the margin of the opening into the box or trough there is a bevel or inclined surface, *i*, which aids to place or pour the food into the feed box or trough.

What we claim is—

A cast-iron feed-box composed of a hollow spherical or globular bottom, B, with a contracted neck where it is joined to the table A, and said table furnished with flanges *b*, recesses *i*, and shields *g*, all constructed and cast in a single piece, as and for the purpose described.

CALVIN W. LINK.
MICHAEL MAHONY.

Witnesses:
JOHN T. LAMPORT,
GEORGE MARK.